US012502475B2

(12) United States Patent
Santin et al.

(10) Patent No.: US 12,502,475 B2
(45) Date of Patent: Dec. 23, 2025

(54) ANTI-VIBRATION DEVICE FOR TRANSPORTING A SUBSTANCE SUCH AS A MESSENGER RNA VACCINE

(71) Applicants: CENTRE NATIONAL DE LA RECHERCHE SCIENTIFIQUE, Paris (FR); UNIVERSITE POLYTECHNIQUE HAUTS-DE-FRANCE, Valenciennes (FR)

(72) Inventors: Jean-Jacques Santin, Nivelle (FR); Sébastien Paganelli, Marquette en Ostrevant (FR); Sylvain Delobel, Valenciennes (FR); Rémi Delille, Potelle (FR); Laurent Dubar, Preseau (FR)

(73) Assignees: CENTRE NATIONAL DE LA RECHERCHE SCIENTIFIQUE, Paris (FR); UNIVERSITE POLYTECHNIQUE HAUTS-DE-FRANCE

( * ) Notice: Subject to any disclaimer, the term of this patent is extended or adjusted under 35 U.S.C. 154(b) by 0 days.

(21) Appl. No.: 18/694,548

(22) PCT Filed: Sep. 16, 2022

(86) PCT No.: PCT/EP2022/075779
§ 371 (c)(1),
(2) Date: Mar. 22, 2024

(87) PCT Pub. No.: WO2023/046589
PCT Pub. Date: Mar. 30, 2023

(65) Prior Publication Data
US 2024/0390571 A1 Nov. 28, 2024

(30) Foreign Application Priority Data
Sep. 24, 2021 (FR) ....................... 2110071

(51) Int. Cl.
*A61M 5/00* (2006.01)
*A61J 1/16* (2023.01)

(52) U.S. Cl.
CPC .............. *A61M 5/002* (2013.01); *A61J 1/165* (2013.01); *A61J 2200/44* (2013.01)

(58) Field of Classification Search
CPC ...... A61M 5/002; A61J 1/165; A61J 2200/44; A61J 2200/50
(Continued)

(56) References Cited

U.S. PATENT DOCUMENTS 3,667,593 A 6/1972 Pendleton
5,058,397 A * 10/1991 MacDonald ............ A61J 1/165
62/457.2
(Continued)

FOREIGN PATENT DOCUMENTS

DE 102009027454 A1 1/2011
FR 2581513 A1 11/1986
(Continued)

OTHER PUBLICATIONS

International Search Report and Written Opinion issued in corresponding International Application No. PCT/EP2022/075779, mailed Jan. 23, 2023, European Patent Office, Rijswijk, Netherlands, pp. 1-6.

*Primary Examiner* — Rafael A Ortiz
(74) *Attorney, Agent, or Firm* — HAUPTMAN HAM, LLP

(57) ABSTRACT

A case for transporting a substance such as a messenger RNA vaccine, including a container, a damping material contained in the container and a storage structure immersed in the damping product, the storage structure forming cavities for receiving syringes containing said substance.

11 Claims, 3 Drawing Sheets

(58) Field of Classification Search
USPC .......................... 206/365, 364, 828, 571, 545
See application file for complete search history.

(56) References Cited

U.S. PATENT DOCUMENTS

| | | | |
|---|---|---|---|
| 8,887,944 B2 * | 11/2014 | Deane | ................ B65D 81/3802 |
| | | | 220/592.2 |
| 2009/0049845 A1 * | 2/2009 | McStravick | .......... A61M 5/003 |
| | | | 62/3.62 |
| 2012/0181285 A1 | 7/2012 | Krauss et al. | |
| 2021/0247074 A1 * | 8/2021 | Sinur | .................. F24C 15/2021 |

FOREIGN PATENT DOCUMENTS

| | | | | |
|---|---|---|---|---|
| GB | 2144208 A | | 2/1985 | |
| WO | WO-9729331 A1 * | | 8/1997 | ................ B01L 7/00 |
| WO | 2013031264 A1 | | 3/2013 | |

* cited by examiner

ANTI-VIBRATION DEVICE FOR TRANSPORTING A SUBSTANCE SUCH AS A MESSENGER RNA VACCINE

The present application is a U.S. National Phase of International Application Number PCT/EP2022/075779, filed Sep. 16, 2022, which claims priority to French Application No. 2110071, filed Sep. 24, 2021.

TECHNICAL FIELD

The invention relates to the field of the transport of a substance such as a fluid.

The invention has particular, but in no way limitative, interest for the transport of a messenger ribonucleic acid (hereinafter "RNA") vaccine contained in ready-for-use syringes.

PRIOR ART

In the context of the pandemic caused by SARS-Cov-2, vaccination programmes have been widely deployed, in particular in order to administer messenger RNA vaccines.

From a logistic point of view, vaccine concentrates are typically stored in flasks and delivered frozen to vaccination centres.

Before administration, each flask is thawed and a solvent is injected therein so as to form several doses of vaccine, which are respectively introduced into syringes.

With regard to storage, a non-diluted thawed vaccine can typically be stored for up to 120 hours before dilution at a temperature between 2° C. and 8° C. and up to two hours at a temperature of less than or equal to 30° C., while a diluted vaccine can typically be stored for up to six hours at a temperature between 2° C. and 30° C.

Since such vaccines are moreover sensitive to vibrations and accelerations after thawing and dilution, it is currently in practice impossible to transport doses of vaccine to the home of persons who cannot go to the vaccination centre.

DESCRIPTION OF THE INVENTION

One aim of the invention is to enable professionals to transport doses of thawed and diluted vaccine, ready for use, with a view to being able to vaccinate persons at home.

More generally, the invention aims to procure a solution allowing the transport of substances sensitive to accelerations and, optionally, having to be stored under temperature conditions potentially below ambient temperature.

For this purpose, the object of the invention is a device for transporting a substance, comprising a receptacle, a damping product contained in the receptacle and a storage structure immersed in the damping product, the storage structure forming cavities intended to store said substance.

The invention thus makes it possible to transport, in particular, doses of vaccine, for example of the messenger ribonucleic acid type, ready to be administered, while reducing the accelerations to which this vaccine is subjected.

Naturally, the device of the invention, also referred to as a transport case or box, can be used for transporting a substance different from a messenger RNA vaccine, for example another medication or any substance comprising molecules or components sensitive to accelerations.

In one embodiment, the damping product is a viscous product.

A viscous product makes it possible to damp relative movements of the receptacle with respect to the storage structure and thus to reduce the transmission of accelerations from the receptacle to the storage structure.

A viscous product also makes it possible to reduce the flow of this product in the receptacle, which helps to reduce thermal exchanges between the receptacle and the storage structure.

In one embodiment, the damping product is a gel.

In a variant, the damping product can be in the form of a viscous fluid in a state different from gel, for example in liquid form.

In one embodiment, the damping product is a cooling medium.

This makes it possible to increase the thermal inertia of the damping product and thus to increase the absorption of the temperature differences between the receptacle and the storage structure, as well as the corresponding variations in temperature.

By way of example, the damping product can comprise a synthetic gel of the carboxymethylcellulose type having a density of 1.122 kg/L and a dynamic viscosity at 5° C. of 6.34 Pa·s.

In one embodiment, the storage structure comprises a plurality of pockets each forming a respective one of the cavities and an elastically deformable connecting piece connected firstly to each of the pockets and secondly to the receptacle.

Said pockets can comprise polypropylene.

Said connecting piece can comprise silicone.

In one embodiment, the receptacle comprises an internal shell and an external shell.

A double shell, or double jacket, makes it possible to improve the vibratory isolation and/or the thermal insulation of the damping fluid with respect to the exterior of the device.

Preferably, the internal shell and the external shell are connected to each other by suspension and/or damping members.

Such members make it possible to damp or absorb the shocks and vibrations and therefore further to reduce the accelerations to which the substance stored in the storage structure is subjected.

In one embodiment, each of the internal and external shells comprises a bottom wall and a peripheral wall.

Said suspension and/or damping members can comprise at least one first member interposed between the bottom wall of the internal shell and the bottom wall of the external shell.

Alternatively or in a complementary manner, the suspension and/or damping members can comprise at least one second member interposed between the peripheral wall of the internal shell and the peripheral wall of the external shell.

By way of example, said first member can comprise suspension studs.

By way of example, said second member can comprise damping studs.

These suspension and/or damping members can comprise elastomer and/or a polyurethane foam.

For example, said suspension studs can be made from elastomer and said damping studs can be made from polyurethane foam.

Naturally, other damping and/or suspension materials can be used to produce these members.

The device preferably comprises a removable closure member making it possible to selectively close off the cavities of the storage structure and to leave clear an opening in order to be able to insert elements therein or remove elements therefrom, typically said syringes.

This closure member can be a lid connected to the receptacle.

This closure member can comprise sealing means, which can in particular be configured to reduce the thermal exchanges between the external space of the device and the interior of the cavities of the storage structure and/or of the receptacle.

The receptacle and/or the storage structure can comprise a thermally insulating material, for example a glass-fibre composite material.

Moreover, the receptacle and/or the storage structure can comprise a reflective material so as to reduce the exposure of the content of the storage structure to electromagnetic radiations of the infrared radiation type.

This is advantageous in particular when this content comprises a vaccine or another light-sensitive substance.

For example, the receptacle can comprise a reflective film covering an external surface of the receptacle.

When the receptacle is of the double-shell type, it is preferable to dispose such a film on an external surface of the internal shell, in order to reduce any mechanical contacts liable to damage it.

The device can of course comprise, as a complement to the receptacle described above, other elements forming one or more additional storage modules.

Thus, in one embodiment, said receptacle forms a first compartment, the device comprising a second storage compartment.

Non-limitatively, this second compartment can be intended to store flasks containing a substance such as a messenger ribonucleic acid vaccine.

In such an embodiment, the device preferably comprises a member for coupling the first compartment and the second compartment to each other.

This coupling member can be configured to allow rapid coupling/uncoupling, for example by means of a rapid-fixing mechanism comprising toggle latches with hooks.

Another object of the invention is an assembly comprising a device as defined above, one or more cases and one or more syringes.

Preferably, the syringes contain a substance such as a messenger ribonucleic acid vaccine.

In one embodiment, each syringe is housed in a respective one of the cases, each case being received with the syringe that it houses in a respective one of the cavities of the storage structure of the device.

The cases make it possible to preserve the syringes from external mechanical attacks.

For each syringe and corresponding case, a locking means preventing a piston from moving with respect to a body of this syringe, at least when the syringe is housed in its case, is preferably provided.

According to a first variant, the locking means comprises a clamp or a removable holding member disposed on the syringe before it is inserted in its case.

According to a second variant, the locking means is formed by the case itself.

In one embodiment, each syringe received with its case in a respective one of the cavities of the storage structure is disposed so that a needle of this syringe is oriented towards an insertion end of this cavity.

When the device is in a reference arrangement according to the terrestrial reference frame, it is preferred for this arrangement to cause an orientation of the needle vertically upwards.

Such an orientation makes it possible to avoid the expansion of any air bubble present in the syringe causing a leakage of vaccine via its needle.

Other advantages and features of the invention will emerge from the reading of the following detailed non-limitative description.

BRIEF DESCRIPTION OF THE DRAWINGS

The following detailed description refers to the accompanying drawings, on which.

DETAILED DESCRIPTION OF EMBODIMENTS

Figure 1:
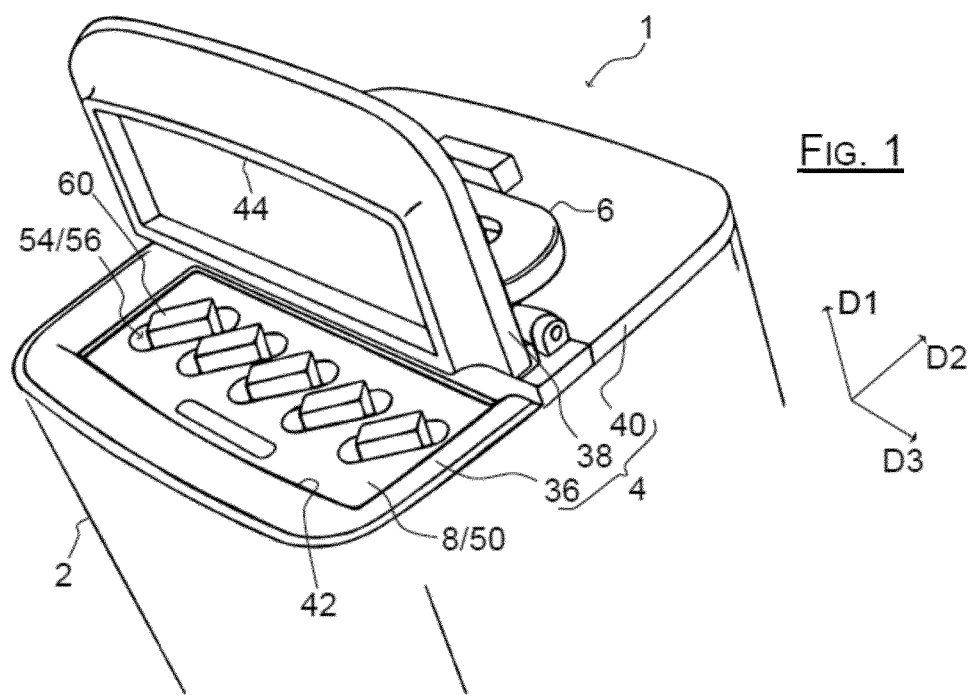
FIG. 1 is a schematic perspective view of a part of a transport device according to the invention, showing a receptacle containing a storage structure and a lid with two leaves, one of the leaves being in the open position and thus allowing access to the storage structure, the other leaf being in the closed position.
Figure 2:
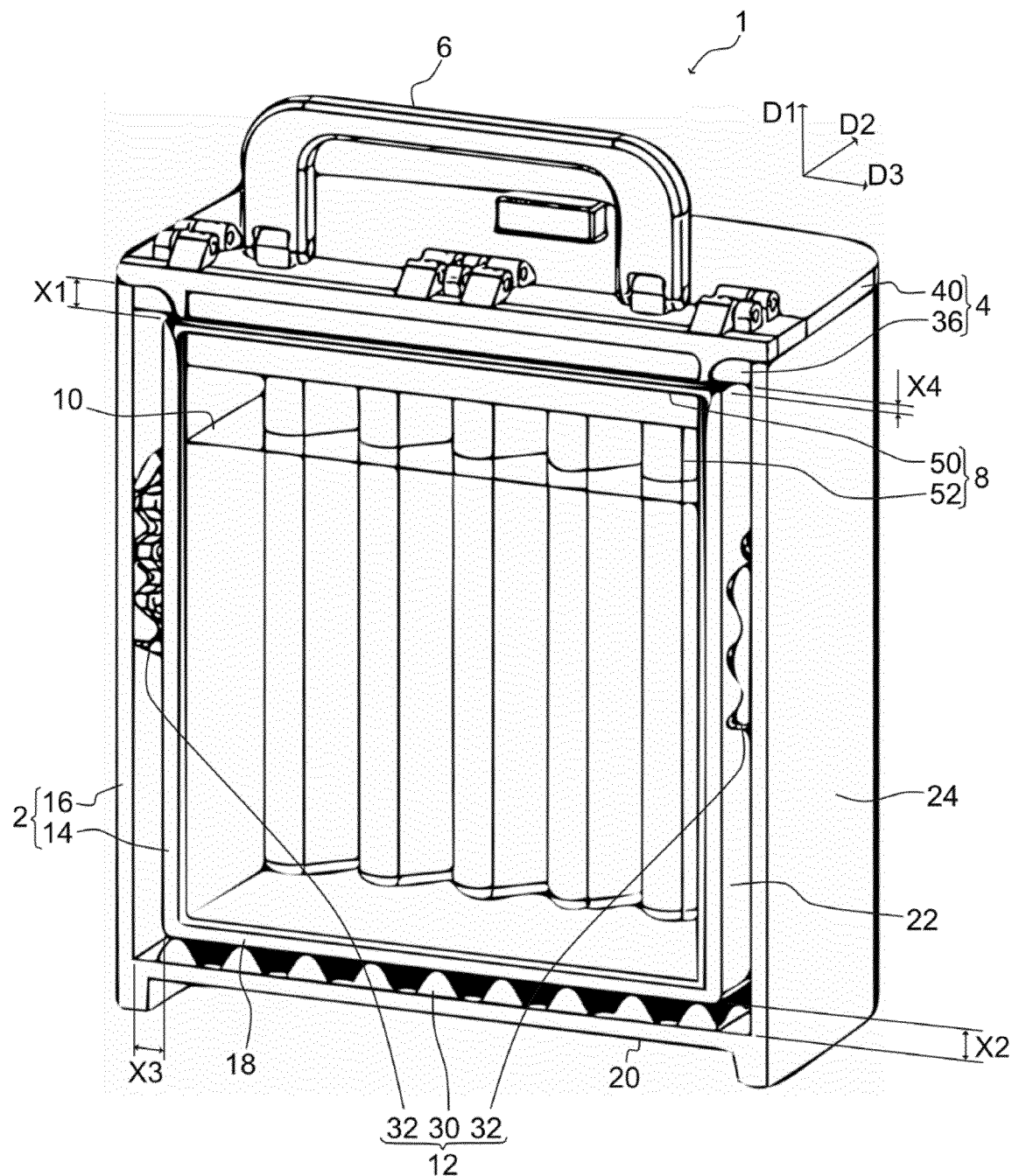
FIG. 2 is a schematic perspective view in longitudinal section of the device of FIG. 1, showing a double-jacket structure forming the receptacle and the storage structure immersed in a viscous product contained in the receptacle.
Figure 3:
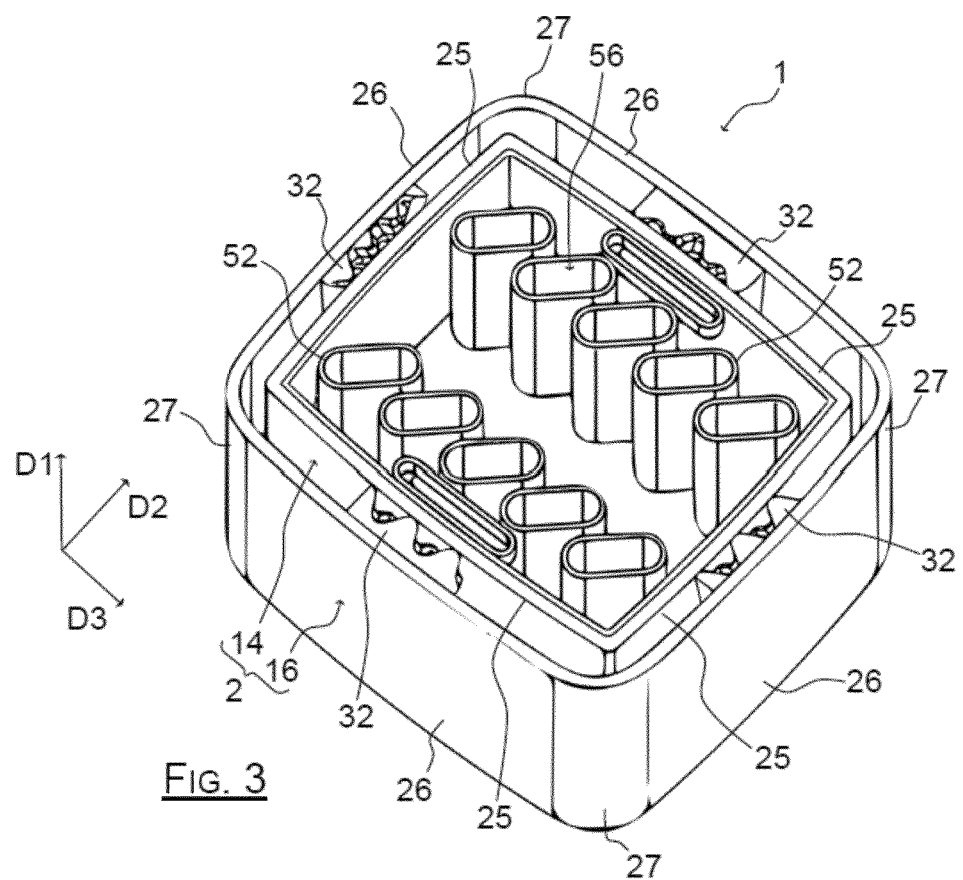
FIG. 3 is a schematic perspective view in cross section of the device of FIG. 1.

FIGS. 1 to 3 comprise a reference frame D1, D2 and D3 defining respectively a vertical direction, a first horizontal direction and a second horizontal direction.

FIGS. 1 to 3 show a device 1 according to the invention, in the form of a transport case.

This transport case 1 comprises a receptacle 2, a lid 4, a gripping member 6, a storage structure 8, a damping product 10 and suspension and damping members 12.

With reference to FIGS. 2 and 3, the receptacle 2 comprises in this example an internal shell 14 and an external shell 16.

The shells 14 and 16 each have a roughly parallelepipedal shape extending longitudinally along the direction D1.

Each of the shells 14 and 16 comprises firstly a bottom wall, respectively 18 and 20, which extends in a horizontal plane D2-D3 and defines a bottom end of the shell 14/16 and, secondly, a peripheral wall, respectively 22 and 24, which extends in the direction D1 vertically to the bottom wall 18/20.

In this example, the peripheral wall 22 of the internal shell 14 comprises, in this example, four substantially planar wall elements 25 (cf. FIG. 3) that are directly connected to each other and each extend vertically to a respective edge of the bottom wall 18. The peripheral wall 24 of the external shell 16 for its part comprises four substantially planar wall elements 26 (cf. FIG. 3) that are connected together by curved wall elements 27 (cf. FIG. 3) and each extend vertically to a respective edge of the bottom wall 20.

The geometry of the wall elements 27 is in particular intended to encourage the users to keep the transport case 1 in the vertical position, i.e. in abutment on its bottom end.

For each of the shells 14 and 16, the peripheral wall 22/24 thus comprises a first end along D1 that is connected to the bottom wall 18/20 and a second end along D1 that defines a top end of the shell 14/16.

In this way, each of the shells 14 and 16 forms a hollow space that is delimited vertically by the bottom wall 18/20 and laterally by the peripheral wall 22/24 and is open at the top end of the shell 14/16.

The shells 14 and 16 are sized so as to be able to dispose the internal shell 14 entirely inside the hollow space formed by the external shell 16, as illustrated on FIG. 2.

More precisely, in the configuration of FIG. 2, the top end of the internal shell 14 is located at a distance X1 from the top end of the external shell 16 so that the bottom walls 18 and 20 define between them a space of dimension X2 along D1 and so that the wall elements 25 and 26 of the peripheral walls 22 and 24 define in pairs between them a space of dimension X3 in the direction D2 or D3.

With regard to the structure of the shells 14 and 16, these are both rigid.

In this example, the external shell 16, which constitutes the external part of the transport case 1, comprises a material such as plastic in order to protect the receptacle 2 from impacts.

The internal shell 14 comprises in this example a thermally insulating multilayer material.

In this embodiment, the internal shell 14 comprises for this purpose a sheet of pressed aluminium covered with a first layer of glass-fibre composite and a second self-adhesive layer comprising a material reflecting infrared rays.

In this example, these thermal-insulation layers form an external surface of the internal shell 14.

Naturally, such thermal insulation can be formed, alternatively or in a complementary manner, on the external shell 16 or in another manner.

In addition, the geometry of the shells 14 and 16 and the materials thereof can be different from those described above.

The shells 14 and 16 are connected to each other by suspension and damping members 12.

In this example, these members 12 comprise studs 30 made from silicone elastomer gel interposed between the bottom wall 18 of the internal shell 14 and the bottom wall 20 of the external shell 16.

The internal shell 14 thus rests, under the action of gravity, on the bottom wall 20 of the external shell 16 via the studs 30, which thus constitute a suspension member for the internal shell 14.

Since a silicone elastomer gel has very low thermal conductivity, typically of the order of 0.22 W/mK, such suspension studs 30 make it possible to reduce the thermal conduction between the shells 14 and 16.

The members 12 of FIG. 2 also comprise studs 32 made from polyurethane foam interposed between the peripheral wall 22 of the internal shell 14 and the peripheral wall 24 of the external shell 16 (see also FIG. 3).

The studs 32 thus form a member for damping relative movements of the shells 14 and 16 with respect to each other.

Since a polyurethane foam has very low thermal conductivity, typically of the order of 0.028 W/mK, such suspension studs 32 also make it possible to reduce the thermal conduction between the shells 14 and 16.

The members 12 make it possible to isolate the shells 14 and 16 with respect to each other both on the vibratory level, by filtering mainly low frequencies, and on the thermal level, both by conduction and by convection.

This is because the members 12 form physical obstacles that interfere with the circulation of air between the shells 14 and 16.

In this regard, in variants that are not shown, provision can be made for disposing, at the periphery of the members 12, obstacles configured to further prevent the transport of heat by convection, for example by means of a material such as an expanded polystyrene foam.

More generally, the shells 14 and 16 can be connected to each other by one or more damping and/or suspension members different from those described above or otherwise arranged.

The result of the above description is that, firstly, the shells 14 and 16 are not in direct mechanical connection with each other and, secondly, the structure thereof and the members 12 that connect them make it possible in this example to reduce thermal exchanges by conduction, by convection, and by radiation.

With regard to the lid 4, this comprises, in the example in FIGS. 1 and 2, a fixed part 36 and two leaves 38 and 40 symmetrical with respect to each other.

As can be seen on FIG. 2, the fixed part 36 of the lid 4 comprises a portion, fitted to the internal dimension of the external shell 16 and secured thereto by securing means (not shown) such as screws or glue.

Thus secured to the external shell 16, the fixed part 36 of the lid 4 extends facing the top end of the internal shell 14 (see FIG. 2). Said distance X1 is selected so that the fixed part 36 is located at a nonzero distance X4 from the top end of the internal shell 14, in particular so as not to interfere with movements of the shells 14 and 16 with respect to each other.

The leaves 38 and 40 are each connected to the fixed part 36 of the lid 4 in a pivot connection so as to be able to be moved, independently of each other, between a closed position (see leaf 40 on FIGS. 1 and 2) and an open position (see leaf 38 on FIG. 1).

The fixed part 36 of the lid 4 defines two openings 42 that can each be closed off by a respective one of the leaves 38 and 40. Only one of these openings 42 is visible on FIG. 1, this being left clear by opening the leaf 38.

In this example, the gripping member 6 of the transport case 1 is connected to the lid 4.

This gripping member 6 forms in this case a handle connected to the fixed part 36 of the lid 4 in a pivot connection, so as to be able to be moved between a folded position (FIG. 1) and an unfolded position (FIG. 2).

With regard now to said storage structure 8, this comprises a connecting piece 50 and pockets 52 secured to the connecting piece 50.

The connecting piece 50 is in this example a silicone plate, i.e. an elastically deformable piece, secured to the top end of the internal shell 14 of the receptacle 2 (see FIG. 2).

With reference to FIG. 2, the plate 50 is in this case glued to a rim of the top end of the internal shell 14.

The top end of the internal shell 14 can of course be machined or provided with a flange or an extension element so as to increase the gluing surface (not shown).

The plate 50 comprises two series of five openings 54. The openings 54 of a first of these series, visible on FIG. 1, are configured so as to extend facing the leaf 38 of the lid 4 when this leaf 38 is in the closed position and to be able to be left clear when this leaf 38 is opened. In a similar manner, the openings in the second series, not visible, are configured to extend facing the leaf 40 when the latter is in the closed position and to be left clear when this leaf 40 is opened.

In this example, the pockets 52 of the storage structure 8 are ten in number (cf. FIG. 3).

Each pocket 52 is here formed by a hollow envelope made from polypropylene that has a roughly oval cross-section (FIG. 3) and extends longitudinally in the direction D1 (cf. FIGS. 2 and 3), so as to define a cavity 56 (cf. FIG. 3) that extends along this direction D1, at least in an initial reference position, i.e. in the absence of external chemical stresses applied to the transport case 1.

Each pocket 52 thus has, in the direction D1, a bottom end and a top end defining an opening for the cavity 56 that it forms.

Each pocket 52 is secured by its top end to the plate 50 of the storage structure 8, in this example by gluing, so that the opening of the cavity 56 that it forms is facing a respective opening 54 in the plate 50.

In this way, each opening 54 in the plate 50 makes it possible to introduce or remove an object or element in the cavity 56 of a respective one of the pockets 52, when the corresponding leaf 38 or 40 is open.

The top end of the pockets 52 thus forms an insertion end.

With reference to FIG. 2, which shows five pockets 52 extending in line with the openings 54 of said second series, the pockets 52 thus extend entirely in the hollow space formed by the internal shell 14 of the receptacle 2.

The plate 50 of the storage structure 8 thus makes it possible to connect each of the pockets 52 to the receptacle 2, maintaining them in a relatively stable position while allowing slight movements of the pockets 52, independently of each other, with respect to the internal shell 14 of the receptacle 2, because of the deformability of the plate 50.

In this example, in order to improve the thermal insulation of the assembly, the leaves 38 and 40 of the lid 4 each comprise an elastically deformable lip 44 that comes into abutment on the plate 50 of the storage structure 8 when the leaves 38 and 40 are closed.

With reference to FIG. 2, the aforementioned damping product 10 is contained in the receptacle 2.

In this example, the product 10 reaches a level greater than eighty percent of the height of the internal shell 14, i.e. it almost entirely fills the hollow space formed by this internal shell 14.

The product 10 is in this example a viscous refrigerating product in the form of a gel, of the carboxymethylcellulose type.

In a variant embodiment, the product 10 can be a viscous fluid in liquid form.

The pockets 52 of the storage structure 8 are each immersed in the gel 10, which thus makes it possible to damp vibrations of the receptacle 2, by filtering in particular high frequencies.

The storage structure 8 is consequently under viscoelastic support, thus forming a damping mechanism of the mass-spring-gel type.

In a variant embodiment, the storage structure 8 can comprise ballasting means (not shown) making it possible to compensate for the buoyancy exerted by the gel 10. Such ballasting means make it possible in particular to relieve the connection of the plate 50 to the receptacle 2 and the connection of the pockets 52 to the plate 50.

Since it is a cooling medium, the gel 10 has a thermal inertia enabling it to keep the pockets 52 and the content thereof at a temperature different from the ambient temperature.

In the example described above, the plate 50 provides hermetic closure of the internal shell 14 of the receptacle 2, preventing accidental emergence of gel 10.

In a variant embodiment that is not shown, the product 10 can be enveloped by a membrane in order to reduce the risk of leakage of product 10, for example in a situation where the transport case 1 was not held vertically.

One envisaged use of the transport case 1 will now be described, for transporting a substance such as a messenger ribonucleic acid vaccine.

The transport case 1 is first of all placed in cold storage so that the gel 10 reaches an initial temperature, typically a temperature of approximately 2° C.

The dilute vaccine is next introduced into syringes (not shown) conventionally including a body, an injection needle and a piston for ejecting the vaccine from the syringe via the needle.

Each filled syringe is housed in a case 60 (visible on FIG. 1) comprising in this example two half-shells made from plastics material.

It is preferred for each case 60 to comprise a member configured to hold the piston in the same position, in order to avoid movement thereof during transport.

Each case 60, housing a syringe thus filled, is inserted in a respective one of the cavities 56 of the storage structure 8 of the transport case 1.

The size of the cases 60 is adjusted to that of the cavities 56 in order to improve holding thereof in position in the pockets 52 of the solid structure 8, which also makes it possible to guide insertion thereof in the cavities 56. For example, the cases can have a cross-section identical to or at least partially complementary to those of the cavities 56.

According to the invention, each case 60 is inserted in a respective cavity 56 of the storage structure 8 so that the needle of the syringe that it houses is oriented vertically upwards, i.e. in the direction of the lid 4, in order to avoid the vaccine emerging from the syringe under the action of the expansion of any air bubble present in the syringe.

The cases 60 and/or the cavities 56 can for this purpose comprise mistake-proofing.

Preferably, the transport case 1 is next placed in an isothermal bag anchored in vertical position in a vehicle such as a car for transport thereof to a vaccination site, for example at the home of the patient.

During such transport, the vaccine contained in the syringes is thus preserved firstly from vibrations by means of the gel 10 and the members 12 of the transport case 1 and, secondly, from ambient heat by means of the various thermal insulation means described above.

Naturally, numerous variants can be made to the above description without departing from the scope of the invention. For example, the transport case 1 can be equipped with a measurement and alert system (not shown) comprising for example a thermometer measuring the temperature of the gel 10 and/or a chronometer or a countdown and/or an alarm indicating for example a gel temperature located outside a range of allowable temperatures during a given period.

In a variant embodiment, not shown, the transport case 1 can comprise another receptacle similar to the receptacle 2 or different therefrom to store an additional quantity of vaccine and/or to store other substances or elements. In this context, the transport case 1 can comprise a member for coupling this other receptacle to the receptacle 2 described above and/or to other parts of the transport case 1.

The invention claimed is:

1. A device for transporting a substance, the device comprising a receptacle, a damping product contained in the receptacle and a storage structure immersed in the damping product, the storage structure having cavities formed therein for storing said substance, the receptacle comprises an internal shell and an external shell connected to each other by suspension and/or damping members, each of the internal and external shells comprises a bottom wall and a peripheral wall, said suspension and/or damping members comprising:

at least one first member interposed between the bottom wall of the internal shell and the bottom wall of the external shell, this first member comprising elastomer suspension studs, at least one second member interposed between the peripheral wall of the internal shell and the peripheral wall of the external shell.

2. The device according to claim 1, wherein the damping product is a viscous product.

3. The device according to claim 1, wherein the damping product is a cooling medium.

4. The device according to claim 1, wherein the storage structure comprises a plurality of pockets each forming a respective one of the cavities and an elastically deformable connecting piece connected firstly to each of the pockets and secondly to the receptacle.

5. The device according to claim 1, wherein said receptacle forms a first compartment, the device comprising a second storage compartment and a member for coupling the first compartment and the second compartment with each other.

6. The device according to claim 2, wherein the viscous product is a gel.

7. The device according to claim 1, wherein the second member comprises damping studs.

8. The device according to claim 7, wherein the damping studs are polyurethane foam damping studs.

9. An assembly comprising a device according to claim 1, one or more cases and one or more syringes containing a substance, each syringe being housed in a respective one of the cases, each case being received with the syringe that it houses in a respective one of the cavities of the storage structure of the device.

10. An assembly according to claim 9, wherein each syringe received with a corresponding case in a respective one of the cavities of the storage structure is disposed so that a needle of the syringe is oriented towards an insertion end of the cavity and, when the device is in a reference arrangement according to the terrestrial reference frame, so that the needle is oriented vertically upwards.

11. The assembly according to claim 9, wherein the substance is a messenger ribonucleic acid vaccine.

* * * * *